(12) United States Patent
Pehrson et al.

(10) Patent No.: US 7,691,262 B2
(45) Date of Patent: Apr. 6, 2010

(54) SYSTEM FOR TREATING WASTEWATER HAVING A CONTROLLED REACTION-VOLUME MODULE USABLE THEREIN

(75) Inventors: Richard L. Pehrson, Limerick, PA (US); Wayne J. Flournoy, Chapel Hill, NC (US); Sarah B. Hubbell, Mont Clare, PA (US)

(73) Assignee: Entex Technologies Inc., Chapel Hill, NC (US)

( * ) Notice: Subject to any disclaimer, the term of this patent is extended or adjusted under 35 U.S.C. 154(b) by 0 days.

(21) Appl. No.: 12/250,053

(22) Filed: Oct. 13, 2008

(65) Prior Publication Data
US 2009/0038999 A1 Feb. 12, 2009

Related U.S. Application Data

(62) Division of application No. 11/284,792, filed on Nov. 22, 2005, now Pat. No. 7,445,715.

(60) Provisional application No. 60/629,955, filed on Nov. 22, 2004.

(51) Int. Cl.
C02F 3/00 (2006.01)
(52) U.S. Cl. ..................................................... 210/150
(58) Field of Classification Search .................. 210/615, 210/150
See application file for complete search history.

(56) References Cited

U.S. PATENT DOCUMENTS

| 3,617,541 A * | 11/1971 | Pan | 210/615 |
|---|---|---|---|
| 3,785,620 A | 1/1974 | Huber | |
| 3,842,804 A * | 10/1974 | Christensen et al. | 119/227 |
| 3,864,246 A | 2/1975 | Casey at al. | |
| 3,947,532 A | 3/1976 | Skold et al. | |
| 3,954,615 A | 5/1976 | Shelef | |
| 3,966,608 A | 6/1976 | Mason et al. | |
| 4,169,050 A | 9/1979 | Serfling et al. | |
| 4,177,147 A | 12/1979 | Roberts | |
| 4,267,052 A | 5/1981 | Chang | |
| 4,279,753 A | 7/1981 | Nielson et al. | |

(Continued)

FOREIGN PATENT DOCUMENTS
EP 0110715 A1 6/1984

(Continued)

OTHER PUBLICATIONS

Water Environment & Technology, David R. Jackson, Leonard E. Ripley, Tod Maurina and Sarah Hubbell, Up to the Challenge IFAS Helps Growing Texas City Meet Discharge Limits, Expand Capacity, magazine, Nov. 2007, pp. 51-55, Water Environment & Technology.

(Continued)

Primary Examiner—Chester T Barry
(74) Attorney, Agent, or Firm—Smith Moore Leatherwood LLP

(57) ABSTRACT

A wastewater treatment system including a biological reactor is disclosed. At least one controlled-reaction-volume module is provided to the biological reactor. The at least one controlled-reaction-volume module includes a fixed-film media for supporting a biological growth. At least one mixer, such as, for example, a high momentum mixer, for communicate a fluid to the at least one controlled-reaction-volume module so that wastewater and the biological growth communicate to thereby treat the wastewater.

32 Claims, 6 Drawing Sheets

U.S. PATENT DOCUMENTS

| | | | |
|---|---|---|---|
| 4,296,050 A | | 10/1981 | Meier |
| 4,303,600 A | | 12/1981 | Roe, Jr. |
| 4,422,930 A | | 12/1983 | Hatanaka |
| 4,425,231 A | | 1/1984 | Fujimoto et al. |
| 4,431,549 A | | 2/1984 | Highstreet et al. |
| 4,434,061 A | | 2/1984 | McDowell |
| 4,595,296 A | | 6/1986 | Parks |
| 4,599,174 A | | 7/1986 | McDowell |
| 4,620,930 A | | 11/1986 | McDowell |
| 4,668,387 A | | 5/1987 | Davie et al. |
| 4,818,404 A | | 4/1989 | McDowell |
| 4,940,540 A | * | 7/1990 | McDowell .................. 210/150 |
| 5,458,779 A | | 10/1995 | Odegaard |
| 5,468,392 A | * | 11/1995 | Hanson et al. ............. 210/615 |
| 5,543,039 A | | 8/1996 | Odegaard |
| 5,549,828 A | * | 8/1996 | Ehrlich ....................... 210/602 |
| 5,580,644 A | * | 12/1996 | Minami ....................... 428/221 |
| 5,585,266 A | * | 12/1996 | Plitt et al. .................. 435/395 |
| 5,771,716 A | | 6/1998 | Schlussel |
| 5,863,128 A | | 1/1999 | Mazzei |
| 6,039,873 A | | 3/2000 | Stahler |
| 6,126,829 A | | 10/2000 | Gunnarsson et al. |
| 6,170,216 B1 | | 1/2001 | Rye et al. |
| 6,173,526 B1 | | 1/2001 | Mazzei |
| 6,383,373 B1 | | 5/2002 | Nakao et al. |
| 6,444,126 B1 | | 9/2002 | Gates et al. |
| 6,464,211 B1 | | 10/2002 | Downs |
| D465,257 S | | 11/2002 | Van Olst et al. |
| 6,726,838 B2 | | 4/2004 | Shechter et al. |
| 6,730,214 B2 | | 5/2004 | Mazzei |
| 7,445,715 B2 | * | 11/2008 | Pehrson et al. ............. 210/615 |
| 2003/0192827 A1 | | 10/2003 | McDowell et al. |
| 2004/0011737 A1 | | 1/2004 | McDowell et al. |
| 2004/0178132 A1 | | 9/2004 | Nakhla et al. |
| 2004/0256315 A1 | | 12/2004 | Boyd et al. |

FOREIGN PATENT DOCUMENTS

| | | |
|---|---|---|
| EP | 0346013 A1 | 12/1989 |
| EP | 1340720 A1 | 9/2003 |
| WO | WO 91/11396 A1 | 8/1991 |
| WO | 03051485 A1 | 6/2003 |
| WO | 03068694 A1 | 8/2003 |

OTHER PUBLICATIONS

Sarah B. Hubbell, Richard Pehrson and Wayne Flournoy of Entex Technologies Inc., Webitat Advanced IFAS System Addresses Common Fixed Media Concerns, paper, pp. 1-7, Water Environment Federation Technical Exhibition and Conference (WEFTEC) 2006 (Oct. 21, 2006, Dallas, Texas), Water Environment Federation, Alexandria, VA.

Emanuel P. Psaltakis, James Liubicich, Paul Pitt, Paul Antonio and Sole Posada of Hazen and Sawyer, P.C., Demonstration of Integrated Fixed Film Activated Sludge Process for BNR at the Mamaroneck WWTP, article, Copyright 2003, pp. 1-22, Water Environment Federation Technical Exhibition and Conference (WEFTEC) 2003, Water Environment Federation, Alexandria, VA.

Water Environment & Technology, Terry L. Johnson, Cindy Wallis-Lage, Andrew R. Shaw and Jim McQuarrie, IFAS Options Which One is Right for Your Project?, magazine, Nov. 2005, pp. 18-22, Water Environment & Technology.

Terry L. Johnson, Andrew Shaw, Heather Phillips, Nancy Choi, Thomas Lauro, Ralph Butler, and Leah Radko, A Pilot-Scale Comparison of IFAS and MBBR to Achieve Very Low Total Nitrogen Concentrations, article, Copyright 2007, pp. 1-14, vol. 1, No. 5, Water Environment Federation, Alexandria, VA.

Sarah B. Hubbell, Richard Pehrson and Andrew Schuler of Entex Technologies Inc., Eight Years of Successful Cold Weather Nitrification With Integrated Fixed-Film/Activated Sludge, paper, pp. 1-11, Proceedings of the Water Environment Federation Annual Conference (WEFTEC), Dallas, Texas, Oct. 22-25, 2006.

Robert Zammataro, Andrew G. Lynn, P.E., Dee, Donald E. Maurer, P.E., Dee and Roderick D. Reardon, P.E., Dee, Upgrading a Contact Stabilization Treatment Plant to a Nitrifying Activated Sludge Process by Using Integrated Fixed-Film Activated Sludge (IFFAS) Media, paper, pp. 1-9, Date Unknown.

United States Environmental Protection Agency, Fine Pore (Fine Bubble) Aeration Systems, Summary Report, Oct. 1985, pp. 1-50, EPA/625/8-85/010, EPA Water Engineering Research Laboratory, Cincinnati, Ohio.

United States Environmental Protection Agency, Jeremiah J. McCarthy, Technology Assessment of Fine Bubble Aerators, report, Feb. 1982, pp. 1-48, EPA/600/2-82/003, USEPA Municipal Environmental Research Laboratory, Cincinnati, Ohio.

United States Environmental Protection Agency, Fine Pore Aeration Systems, Design Manual, Sep. 1989, pp. 1-305, EPA/625/1-89-023, EPA Center for Environmental Research Information, Cincinnati, Ohio.

Diffuser Express a Division of Environmental Dynamics Inc., Catalog #105-2006, catalog, Date Unknown, pp. 1-30, Diffuser Express, Columbia, MO.

International Search Report & Written Opinion mailed on Apr. 5, 2006 in PCT/US2005/042503.

Entex Technologies, Inc., BioWeb fixed media system, article, Copyright 2004, pp. 1-2, Entex Technologies, Inc., Chapel Hill, NC.

Entex Technologies, Inc., Internet website: (http://www.entexinc.com/Installations.htm), pp. 1-2, Entex Technologies, Inc., Chapel Hill, NC.

Sarah B. Hubbell and David J. Krichten of Brentwood Industries Inc., Demonstration and Full Scale Results of a Plant Upgrade for BNR Using Integrated Fixed-Film Activated Sludge (IFAS) Technology, article, Copyright 2004, pp. 1-8, Water Environment Federation Technical Exhibition and Conference (WEFTEC) 2004, New Orleans, Louisiana, Oct. 2-6, Water Environment Federation, Alexandria, VA.

Brentwood Industries, Integrated Fixed Film/Activated Sludge (IFAS) Technology, article, Copyright Oct. 2001, pp. 1-6, Document 4.0, Brentwood Industries, Reading, PA.

David Krichten and Curtis McDowell, Simultaneous Nitrification and Denitrification in Biofilms of an Engineered Integrated Fixed-Film Activated Sludge (IFAS) System, article, pp. 1-4, Brentwood Industries, Reading, PA.

Hydroxyl Systems Inc., Hydroxyl Systems Advanced Water and Wastewater Treatment, article, Copyright 2003, 66 pages, internet address http://hydroxyl.com/hydroxyl.html, Hydroxyl Systems Inc., Victoria, BC Canada.

Hydroxyl Systems Inc., The Hydroxyl—F3R Process innovative biological treatment technology, article, pp. 1-2, Hydroxyl Systems Inc., Sidney, BC Canada.

Pulsed Hydraulics, Inc., Variable "Speed" Tank Mixing With No In-basin Moving Parts, article, Copyright 2005, 8 pages, internet address http://phiwater.com/, Pulsed Hydraulics, Inc., Bellevue, WA.

Usfilter, Integrated Headworks Systems, article, Copyright 2000, pp. 1-12, LB-HW-BR-1000, USFilter, Chalfont, PA.

\* cited by examiner

SYSTEM FOR TREATING WASTEWATER HAVING A CONTROLLED REACTION-VOLUME MODULE USABLE THEREIN

This application is a division of U.S. utility patent application Ser. No. 11/284,792, filed Nov. 22, 2005, now U.S. Pat. No. 7,445,715, and that claimed the benefit of the filing date of U.S. provisional application Ser. No. 60/629,955, filed Nov. 22, 2004, the disclosures of which are incorporated herein by reference.

The present invention relates generally to a wastewater treatment system including a biological reactor and, more particularly, to a controlled-reaction-volume module useable in wastewater treatment.

BACKGROUND

Wastewater treatment is primarily driven by the need to prevent pollution of lakes and rivers. When wastewater discharged to lakes and rivers contains too many organic compounds that act as food for biological growth or too many nutrients that feed the growth of the biological growth, that biological growth consumes available oxygen, in effect suffocating the wildlife normally found in the streams. Wastewater treatment seeks to eliminate this food (organics) and nutrients prior to discharging. As a final step, the wastewater is also disinfected (usually with chlorine) to prevent the spread of human pathogens (typically viruses and bacteria).

The organic compounds are the carbon-hydrogen compounds predominately formed as the result of biological activity. These compounds come in a wide variety of forms. In order to provide a measure of the amount of organic compounds, the industry has settled on the use of "Biochemical Oxygen Demand" or BOD (normally referred to as 5 day BOD, or BOD5), which simply means the quantity of oxygen consumed by a sample spiked with biological growth over a 5 day period. It is an indirect measure of the organic content.

The nutrients of interest are similar to those used to fertilize a lawn, phosphorus (P) and nitrogen (N). Nitrogen is typically present in the form of ammonia ($NH_3$), which is broken down under aerobic conditions to nitrite and nitrate ($NO_2$ and $NO_3$). These in turn may be reduced to elemental nitrogen by treating under conditions without oxygen (called anoxic when $NO_3$ is present). Normally wastewater is treated under oxic conditions, although certain high strength wastes (typically industrial) are most efficiently treated in the absence of any source of oxygen (air or $NO_3$), a condition called anaerobic, or in the absence of oxygen in its elemental form, but $NO_2$ and/or $NO_3$ are present to provide a source of oxygen, a condition called anoxic.

Thus, the goal of wastewater treatment may be summarized as:

| Offending Constituent | Measured as | Treated by |
| --- | --- | --- |
| Solids | TSS (Total Suspended Solids) | Settling out in a clarifier |
| Organics | BOD | Biological oxic (Anaerobic for high strength) |
| Phosphorus | P | Biological or by use of chemicals |
| Ammonia | $NH_3$ | Biological oxic (reduced to $NO_2/NO_3$) |
| Nitrates/Nitrites | $NO_2/NO_3$ | Biological anoxic |
| Pathogens | — | Chlorine, Ultraviolet, Ozone |

The means of treatment is to provide food (BOD), nutrients (P & N, both normally present in sufficient quantities for cell growth) and oxygen for the biological growth that does the bulk of the treatment. Wastewater treatment may be thought of as creating a comfortable home for the growth of beneficial biological growth to treat the wastes.

To accomplish this end, a wastewater treatment system is built with a biological unit. In biological units, two basic technologies have been used over the years. Originally in Britain, fixed film systems were developed in the 19th Century based on the principle of how rivers and streams become clean; that is, just grow the biological growth on a pile of rocks and trickle the wastewater over the rock pile. Thus, the trickling filter was born. Trickling filters proved to be reliable, and stable, although not particularly flexible in meeting modified treatment needs. Today modern trickling filters use plastic media with corrugated channels similar to those in corrugated cardboard.

In the 1930's a new technology was developed in which the biological growth was freely suspended or fluidized within a flooded tank, allowing for intimate mixing and contact between the waste material, the oxygen, and the biological growth. This technology is called activated sludge, because the tank is continually reseeded or "activated" with a biological growth settled out in a subsequent clarifier and returned to the head end of the basin.

Thus, there remains a need for a new and improved wastewater treatment system based on Integrated Fixed Film Activated Sludge (IFAS) technology that resolves old technical issues. The new and improved wastewater treatment system combines the two technologies to increase the overall concentration of a biological growth available for treatment. The combination creates a system with the stability and robustness of trickling filters and the operational flexibility of activated sludge.

SUMMARY

The present invention is directed to a wastewater treatment system including a biological reactor that, in turn, includes at least one controlled-reaction-volume module. The controlled-reaction-volume module includes a fixed-film media and at least one mixer for communicating a fluid thereto. The fixed-film media supports a biological growth. The mixer may be a high momentum mixer. At least one controller for regulating operation of the wastewater treatment system, in general, and the biological reactor and/or the controlled-reaction-volume module, in particular, may be included.

The at least one controller may be capable of alternating an environment within the at least one controlled-reaction-volume module among, without limitation, any one of aerobic, anoxic, anaerobic, or any combination of any of the preceding. In this manner, the at least one controller may be capable of facilitating a control of a biological-growth predator such as, for example, a worm such as the redworm. Although worms have been presented as an example of biological-growth predators, there any other "non-worm" predators such as, for example, snails or insect larvae, likewise may be controlled.

One means of controlling a biological-growth predator may be through the use of a sensor that is capable of indicating a presence of a biological-growth predator. An example of a sensor is a coupon that might be removably suspended within a controlled-reaction-volume module. At predetermined times, the coupon might be queried by, for example, withdrawing, to either evaluate the state of the biological growth and/or the presence of a biological-growth predator. When a predetermined undesirable level of predator is detected in a controlled-reaction-volume module, steps may be taken to create an environment there within that would reduce or eliminate the predator while at the same time preserve a biological growth. In some instance, the biological growth may be reduced or eliminated and reestablished once the predator has been reduced or eliminated to a satisfactory extent.

Any of a number of type or kind of controllers may be used such as, for example, programmable logic controllers (PLCs); manually operated controllers, time controllers; electrical controllers, mechanical controllers, electro-mechanical controllers, pneumatic controllers, or any combination of any of the preceding that in turn may communicate with one or more sensors imputing information on one or more process control parameters including, without limitation, any one of oxidation-reduction potential (ORP), dissolved oxygen (DO), or any combination of any of the preceding. Also, a controller may be optionally located at the site of the device or integrated into a main and/or sub plant controller without a local panel. In this manner, rather than buying a controller, an integration of the control of the operation of the controlled-reaction-volume module into the main and/or sub plant controller may be accomplished.

When present, the at least one controller may communicate at least with the at least one mixer. Also, the controller may communicate with valves (e.g., actuated pneumatically, electrically, mechanically, hydraulically, electro-mechanically, or any combination of any of the preceding) such as solenoid valves, and/or pumps and or sensors either located within and/or without a controlled-reaction-volume module.

The at least one controller may be capable of controlling organic and/or physical parameters, without limitation, such as a dissolved oxygen concentration, within the at least one controlled-reaction-volume module. When a plurality of controlled-reaction-volume modules are included in a system, the at least one controller may be capable of controlling organic and/or physical parameters, without limitation, such as a dissolved oxygen concentration, within one controlled-reaction-volume module independent of another controlled-reaction-volume module, or a large number of modules.

Any of a variety of sensors may be used either alone or in combination with a controller. For example, the at least one sensor may be capable of measuring, without limitation, any one of biological activity, pH, dissolved oxygen (DO), at least one enzyme level (e.g., of any one of adenosine triphosphate (ATP), adenosine diphosphate (ADP), oxidation-reduction potential (ORP), ammonia, nitrates, nitrites, total P, total N, biological control sensor variables, or any combination of any of the preceding), or any combination of any of the preceding.

In addition, the wastewater treatment system may further include, without limitation, any one of 1) at least one clarifier upstream from the biological reactor; 2) at least one additional clarifier downstream from the biological reactor; 3) at least one headworks upstream from the biological reactor; 4) at least one disinfector downstream from the biological reactor; at least one re-aerator downstream from the biological reactor; or any combination of any of the preceding. Lagoons may have none of the above. Also, industrial applications sometimes only have a biological reactor discharging directly into a sewer line.

Now we turn to a controlled-reaction-volume module usable in a biological reactor of a wastewater treatment system. Such a module includes at least one fixed-film media and at least one mixer. The at least one fixed-film media supports a biological growth. The at least one mixer communicates a fluid to the at least one controlled-reaction-volume module and may be a high momentum mixer. The at least one controlled-reaction-volume module is capable of biological-growth predator control, which as noted above, may include worms.

The at least one controlled-reaction-volume module channels a flow of the fluid in a controlled direction and normally in the vertical direction. This may be accomplished by either a partially horizontally and/or partially vertically enclosed partition or a substantially completely horizontally enclosed and/or vertically enclosed partition. The at least one controlled-reaction-volume module further may include a flow director such as, for example, either an expanded or restricted structure proximate to the at least one mixer. For example, the flow director may be an extension of at least a portion of a partition of the controlled reaction volume module beyond the fixed film media.

An environment within the at least one controlled-reaction-volume module may be, without limitation, any one of aerobic, anoxic, anaerobic, or any combination of any of the preceding. Also, an environment within the at least one controlled-reaction-volume module may be capable of being alternated among, without limitation, any one of aerobic, anoxic, anaerobic, or any combination of any of the preceding.

The at least one controlled-reaction-volume module further may include at least one support mechanism. Such a mechanism may be used to locate a controlled-reaction-volume module within the biological reactor or within a proximity of a controlled-reaction-volume module to impute flow through the controlled-reaction-volume module. Examples of suitable support mechanism include, without limitation, any one of a flotation mechanism, a floor stand, a suspension mechanism, or any combination of any of the preceding. A suspension mechanism may be, without limitation, any one of within the biological reactor, without the biological reactor, toward the top of the biological reactor, the bottom of the biological reactor, the side of the biological reactor, or any combination of any of the preceding.

The at least one controlled-reaction-volume module may be used in conjunction with at least one additional controlled-reaction-volume module. In such case, each of the at least two controlled-reaction-volume modules may be capable of alternating among, without limitation, any one of aerobic, anoxic, anaerobic, or any combination of any of the preceding. Further, the alternating among, without limitation, any one of aerobic, anoxic, anaerobic, and combination thereof may be capable of being independent for each of the at least two controlled-reaction-volume modules.

Moreover, a biological reactor may include at a plurality of controlled-reaction-volume modules. Here too, each of the plurality controlled-reaction-volume modules may be capable of alternating among, without limitation, any one of aerobic, anoxic, anaerobic, and combination thereof. As with the at least two controlled-reaction-volume modules, the alternating may be, without limitation, among any one of aerobic, anoxic, anaerobic, or any combination of any of the preceding is capable of being independent for each of the plurality of controlled-reaction-volume modules.

Turning now to a construction of the at least one controlled-reaction-volume module, it may be a rigid frame 13 capable of supporting or containing the fixed-film media. For example, the fixed-film media may be fixed within the at least one controlled-reaction-volume module by, without limitation, any one of a fabric, such as, for example, a webbed fabric, a single strand rope, a corrugated structural sheet media, a woven fabric, a knitted fabric, or any combination of any of the preceding. Alternatively, the fixed-film media may be capable of mixing within the at least one controlled-reaction-volume module such as, without limitation, any one of a synthetic fiber, an organic fiber, a polymer fixed-film media, sponge-like fixed-film media, a mesh fixed-film media, or any combination of any of the preceding. Such media may have a specific gravity, for example, of between about 0.9 and about 1.2.

No matter the composition or construction of the fixed-film media, a thickness of a biological growth on such a media may be such that it encourages autotrophic organisms. In addition to autotrophic organisms, a biological growth may include heterotrophic growths. Also, a thickness of the biological growth may be a function of, without limitation, any one of an availability of food for therefor, mixing, aeration, position in a biological reactor, or any combination of any of the preceding.

In aerobic systems, a thickness of the biological growth is such that there is a preponderance of aerobic organisms versus anaerobic organisms. In contrast in anaerobic systems, a thickness of the biological growth is such that there is a preponderance of anaerobic organisms versus aerobic organisms.

A thickness of the biological growth may be such that it is capable of substantially maintaining a surface area of the fixed-film media. Suitable examples include, without limitation, any one of being substantially maintained on the surface area of the fixed-film media; substantially maintaining a surface area of the fixed-film media, or any combination of any of the preceding.

Returning now to the at least one mixer, it may be any mixer that permits an interaction of the wastewater and the biological growth to treat the wastewater. Suitable mixers include mechanical mixers such as, for example, paddles or propellers, magnetic stirrers, bubble generator, and combination thereof.

Suitable bubble generators include, without limitation, any one of large or coarse bubble generators, intermediate or medium bubble generators, fine bubble generators, continuous bubble generators, intermittent bubble generators, or any combination of any of the preceding.

Applicants believe that a high momentum mixer would act suitably as a mixer for a controlled-reaction-volume module. Examples of suitable high momentum mixers, in addition to the mixer mentioned above, include jet mixers, a jet aerators, which may be combined with pumps and blowers to discharge through nozzles, pumps, or any combination of any of the preceding.

Further, the at least one mixer may include an aeration mechanism such as, for example, a bubble generator.

A wastewater treatment system may be, without limitation, any one of a municipal wastewater treatment facility, an industrial wastewater treatment facility, a commercial wastewater treatment facility, a ship wastewater treatment facility, an agricultural wastewater treatment facility (e.g., lagoon), a municipal wastewater lagoon, or any combination of any of the preceding.

Accordingly, one aspect of the present invention is to provide a wastewater treatment system including a biological reactor that, in turn, includes at least one controlled-reaction-volume module. The controlled-reaction-volume module includes a fixed-film media and at least one mixer for communicating a fluid thereto. The fixed-film media supports a biological growth.

Another aspect of the present invention is to provide a controlled-reaction-volume module usable in including a biological reactor of a wastewater treatment system. The controlled-reaction-volume module includes a fixed-film media and at least one mixer for communicating a fluid thereto. The fixed-film media supports a biological growth. The mixer may be a high momentum mixer.

Still another aspect of the present invention is to provide a wastewater treatment system including a biological reactor that, in turn, includes at least one controlled-reaction-volume module. The controlled-reaction-volume module includes a fixed-film media and at least one mixer for communicating a fluid thereto. The fixed-film media supports a biological growth. The mixer may be a high momentum mixer. At least one controller for regulating an operation of the wastewater treatment system, in general, and specifically the biological reactor and/or the controlled-reaction-volume module is included.

Yet another aspect of the present invention is to provide a method for treating wastewater. The method includes providing at least one controlled-reaction-volume module and wastewater. The at least one controlled-reaction-volume module includes fixed-film media for supporting a biological growth and is provided to a biological reactor of a wastewater treatment system. The wastewater is provided to the at least one controlled-reaction-volume module. A fluid is communicated to the at least one controlled-reaction-volume module so that the wastewater and the biological growth communicate thereby treating the wastewater.

And yet another aspect of the present invention is to provide a method for treating wastewater. The method includes providing at least one controlled-reaction-volume module and wastewater. The at least one controlled-reaction-volume module includes a fixed-film media for supporting a biological growth. The at least one controlled-reaction-volume module may be provided to a biological reactor of a wastewater treatment system. The wastewater is provided to the at least one controlled-reaction-volume module. A fluid is communicated to the at least one controlled-reaction-volume module at a sufficient momentum so that the wastewater and the biological growth communicate thereby treating the wastewater.

Still yet another aspect of the present invention is to provide a method for treating wastewater. The method includes providing at least one controlled-reaction-volume module and wastewater. The at least one controlled-reaction-volume module includes a fixed-film media for supporting a biological growth. The at least one controlled-reaction-volume module may be provided to a biological reactor of a wastewater treatment system. The wastewater is provided to the at least one controlled-reaction-volume module. A fluid is communicated to the at least one controlled-reaction-volume module at a sufficient momentum so that the wastewater and the biological growth communicate. At least one characteristic of the communicating fluid is controlled to thereby treat the wastewater.

These and other aspects of the present invention will become apparent to those skilled in the art after a reading of the following description of the preferred embodiment when considered with the drawings.

DRAWINGS

DESCRIPTION

Figure 1:
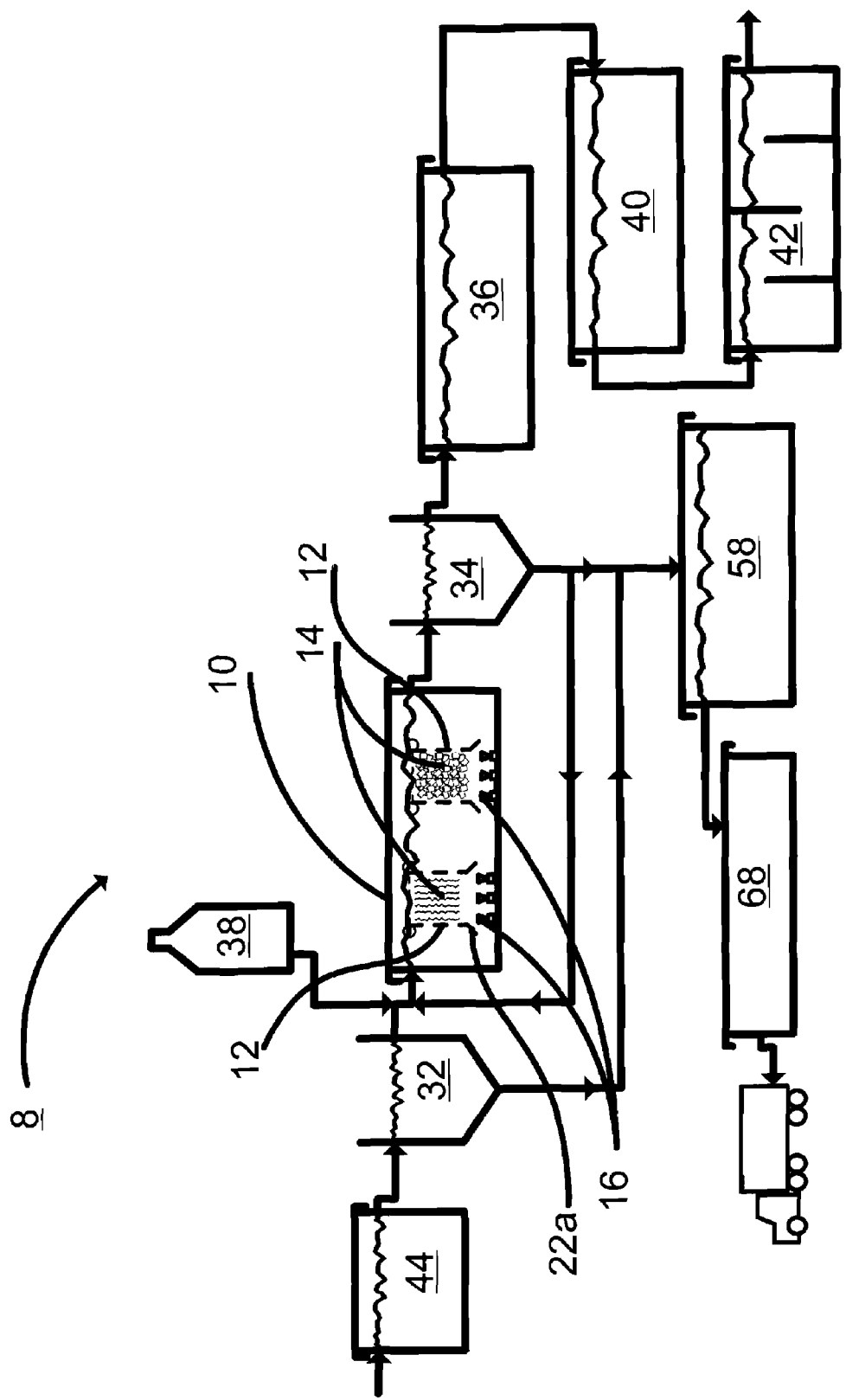
FIG. 1 is a cross-sectional schematic illustrating a wastewater treatment system including controlled-reaction-volume modules according to an embodiment of the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Sewage is the wastewater released by residences, businesses and industries in a community. It is about 99.94 percent water, with only about 0.06 percent of the wastewater dissolved and suspended solid material. The cloudiness of sewage is caused by suspended particles which in untreated municipal sewage typically ranges between about 100 and 350 mg/l. A measure of the strength of the wastewater is biochemical oxygen demand, or BOD. The BOD measures the amount of oxygen microorganisms required in five days to break down sewage. Untreated municipal sewage typically has a BOD ranging between about 100 mg/l and 300 mg/l. Pathogens or disease-causing organisms are present in municipal sewage. Coliform bacteria are used as an indicator of disease-causing organisms. Sewage also contains nutrients (such as ammonia and phosphorus), minerals, and metals. Ammonia can range from about 12 to 50 mg/l and phosphorus can range between about 6 and 20 mg/l in untreated sewage.

Referring now to FIG. 1, wastewater treatment is a multistage process (e.g., including preliminary treatment (see e.g., item 44 of FIG. 1), primary treatment (see e.g., item 32 of FIG. 1), secondary treatment (see e.g., items 10 and 34 of FIG. 1), final treatment (see e.g., items 36, 40, and 42 of FIG. 1), and, optionally, advanced treatment (see e.g., item 38 of FIG. 1)) to renovate wastewater before it reenters a body of water, is applied to the land or is reused. The goal is to reduce or remove organic matter, solids, nutrients, disease-causing organisms and other pollutants from wastewater. Each receiving body of water has limits to the amount of pollutants it can receive without degradation. Each municipal wastewater treatment plant holds a permit listing the allowable levels of BOD, suspended solids, coliform bacteria and other pollutants. The discharge permits are called NPDES permits which stands for the National Pollutant Discharge Elimination System. Industrial wastewater treatment plants that have direct stream discharges also have NPDES permits. Industrial plants that discharge into municipal plants have site specific pretreatment limits.

Preliminary Treatment (see e.g. item 44 of FIG. 1): Preliminary treatment to screen out, grind up, or separate debris is usually the first step in wastewater treatment. Sticks, rags, large food particles, sand, gravel, toys, etc., are removed at this stage to protect the pumping and other equipment in the treatment plant. Treatment equipment such as bar screens, comminutors (a large version of a garbage disposal), and grit chambers are commonly used as the wastewater first enters a treatment plant. The collected debris is usually disposed of in a landfill.

Primary Treatment (see e.g., item 32 of FIG. 1): Primary treatment is usually the second step in treatment and separates suspended solids and greases from wastewater. Waste-water is held in a quiet tank for several hours allowing the particles to settle to the bottom and the greases to float to the top. The solids drawn off the bottom and skimmed off the top receive further treatment as sludge. The clarified wastewater flows on to the next stage of wastewater treatment. Clarifiers and septic tanks are usually used to provide primary treatment.

Secondary Treatment (see e.g., items 10 and 34 of FIG. 1): Secondary treatment is a biological treatment process to remove dissolved organic matter and often, nutrients from wastewater. Biological growth (e.g., sewage microorganisms) is cultivated and added to the wastewater. The biological growth (e.g., microorganisms) absorb organic matter from sewage as their food supply. Three approaches are predominately used to accomplish secondary treatment; fixed film, suspended growth and lagoon systems.

Fixed Film Systems: Fixed film systems grow biological growth (e.g., microorganisms) on substrates such as rocks, sand or plastic. The wastewater is spread over the substrate, allowing the wastewater to flow past the film of biological growth (e.g., microorganisms) fixed to the substrate as in a trickling filter, or the substrate may be fully suspended as in submerged fixed film systems. As organic matter and nutrients are absorbed from the wastewater, the film of biological growth (e.g., microorganisms) grows and thickens. Trickling filters, rotating biological contactors, sand filters, and submerged fixed film systems are examples of fixed film systems.

Suspended Growth Systems: Suspended growth systems stir and suspend biological growth (e.g., microorganisms) in wastewater. As the biological growth (e.g., microorganisms) absorb organic matter and nutrients from the wastewater they grow in size and number. After the biological growth (e.g., microorganisms) have been suspended in the wastewater for several hours, they are settled out as a sludge. Some of the sludge is pumped back into the incoming wastewater to provide "seed" biological growth (e.g., microorganisms). The remainder is wasted and sent on to a sludge treatment process. Activated sludge, extended aeration, oxidation ditch, and sequential batch reactor systems are all examples of suspended film systems.

Lagoon Systems: Lagoon systems are normally large relatively shallow basins which hold the waste-water for a few days to several months to allow for the natural degradation of sewage. These systems may be aerated artificially or take advantage of natural aeration and biological growth (e.g., microorganisms) in the wastewater to renovate sewage.

Integrated Fixed-Film/Activated Sludge(IFAS) System: IFAS systems combine suspended microorganisms (biological growth) with fixed microorganisms (biological growth). A media 14 of the present invention may be used as a carrier for fixed microorganisms (biological growth) portion of an IFAS systems. Descriptions and explanations of basic unit operations are for explanation purposes only and not to be taken as all inclusive.

Final Treatment (see e.g., items 36, 40, and 34 of FIG. 1): Final treatment focuses on removal of disease-causing organisms from wastewater. Treated wastewater can be disinfected by adding chlorine or by using ultraviolet light. High levels of chlorine may be harmful to aquatic life in receiving streams. Treatment systems often add a chlorine-neutralizing chemical to the treated wastewater before stream discharge.

Advanced Treatment (see e.g., item 38 of FIG. 1): Advanced treatment is necessary in some treatment systems to remove nutrients from wastewater. Chemicals are sometimes added during the treatment process to help settle out or strip out phosphorus or nitrogen. Some examples of nutrient removal systems include coagulant addition for phosphorus removal and air stripping for ammonia removal.

Sludges: Sludges are generated through the wastewater treatment process. Primary sludges, material that settles out during primary treatment, often have a strong odor and require treatment prior to disposal. Secondary sludges are predominately the extra biological growth (e.g., microorganisms) from the biological treatment processes. The goals of sludge treatment are to stabilize the sludge and reduce odors, remove some of the water and reduce volume, decompose some of the organic matter and reduce volume, kill disease causing organisms and disinfect the sludge.

Untreated sludges are about 97 percent water. Settling the sludge and decanting off the separated liquid removes some of the water and reduces the sludge volume. Settling can result in a sludge with between about 96 to 92 percent water. More water can be removed from sludge by using sand drying beds, vacuum filters, filter presses, and centrifuges resulting in sludges with between about 80 to 50 percent water. This dried sludge is called a sludge cake. Aerobic and anaerobic digestion are used to decompose organic matter to reduce volume. Digestion also stabilizes the sludge to reduce odors. Caustic chemicals can be added to sludge or it may be heat treated to kill disease-causing organisms. Following treatment, sludges are taken to landfills or spread on fields, returning organic matter and nutrients to the soil.

Wastewater treatment processes require careful management to ensure the protection of the water body that receives the discharge. Trained and certified treatment plant operators measure and monitor the incoming sewage, the treatment process and the final effluent.

Figure 2:
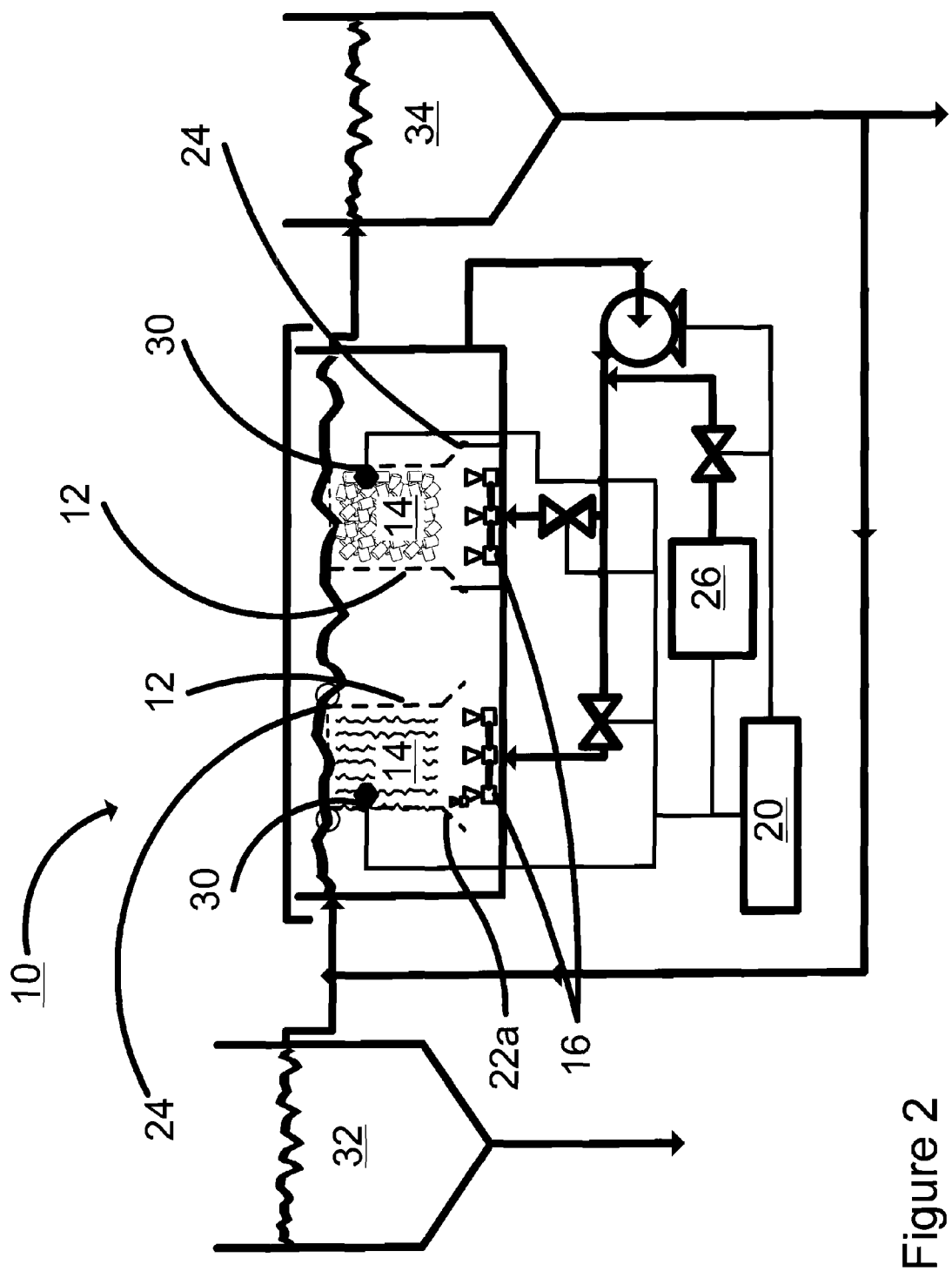
FIG. 2 is a cross-sectional schematic illustrating a portion of wastewater treatment system including controlled-reaction-volume modules according to an embodiment of the present invention.

Referring now to the remaining drawings in general and FIG. 2 in particular, it will be understood that the illustrations are for the purpose of describing a preferred embodiment of the invention and are not intended to limit the invention thereto. As best seen in FIG. 1, a wastewater treatment system, generally designated 8, is shown constructed according to the present invention. The wastewater treatment system 8 may include a number of sub-assemblies including, without limitation, any one of a headworks 44, a clarifier 32, a biological reactor 10 including a controlled reaction volume module 12 (CRVM 12); a second clarifier 34; a filter 36, chemical supply 38, a disinfector 40, a re-aerator 42, or any combination of any of the preceding.

FIG. 1 is a block diagram of a wastewater treatment system 8. Specific unit operations that are shown may be included in the present invention. FIG. 2 is an aspect of the present invention not encompassing all options, but is for example purposes. The headworks 44 may include screening and grit removal that takes large materials and grit (sand and gravel) out of the wastewater for disposal typically in landfills. Screens typically are metal structures with restricted openings that retain materials over a certain size and that have mechanisms for removing the solids from the surface of the screen. Grit removal is typically controlling velocity to cause the heavier grit (rapidly settling) particles to separate from the main wastewater flow. Some systems bypass this step and go directly on to subsequent unit operations. Lagoon systems are often without headworks 44 as well as without clarifiers 32 & 34, that are included in the broad scope of this invention applied to biological treatment systems in general.

Primary clarifier 32 is typically a circular or rectangular tank(s) usually with bottom scraper mechanisms. The wastewater from the headworks 44 enters the clarifier 32 where relatively quiescent conditions allow slower settling particles to fall to the tank bottom and be removed from the main wastewater flow. These solids typically require further treatment for stabilization prior to ultimate disposal.

Wastewater then flows to the biological reactor 10 that is a tank, basin or lagoon where biological activity consumes organics and nutrients in the wastewater accomplishing a major removal function of the wastewater treatment system 8. These biological reactors 10 may be, without limitation, any one of aerobic, anoxic, anaerobic or any combination of any of the preceding. Controlled reaction-volume module(s) will typically be located in the biological reactor 10.

Secondary clarifier 34 receives the effluent from the biological reactor 10 and is typically a circular or rectangular tank(s) with bottom scraper mechanisms. The wastewater from the biological reactor 10 enters the clarifier 34 where relatively quiescent conditions allow the bacteria grown in the biological reactor 10 and other settle able particles to fall to the tank bottom and be removed from the main wastewater flow. The majority of these settled solids are returned to the biological reactor 10. A portion of these solids are wasted from the main wastewater flow and typically require further treatment for stabilization prior to ultimate disposal. Lagoon systems typically eliminate this step.

The wastewater proceeds on to an optional filter 36 where the liquid is passed through sand, fabric or other fine media to remove small remaining suspended solids from the wastewater flow.

Due to the pathogens present in domestic wastewater, a disinfector 40 may be provided where oxidizing agents, ultraviolet light, or other bacterial/viral inactivation agents are applied.

Re-aerator 42 is another optional unit that may be embodied by aerators in a basin or hydraulic pumps in an effluent structure to promote the increase in dissolved oxygen level in the treated wastewater. The treated wastewater typically then goes to a receiving natural body of water or, in the case of many industrial pretreatment plants, into a receiving sewer.

In operation, wastewater containing solids, inorganic and organic components, and/or nutrients enter a wastewater treatment system 8 through headworks 44 that does an initial conditioning step to remove readily separated solids and sand and gravel from the wastewater flow. This simplifies the work required of subsequent unit operations and minimizes equipment wear. The clarifier 32 removes additional settle able solids further reducing the load on subsequent unit operations.

The biological reactor 10 may be a tank, basin, or lagoon either covered or uncovered. Biological conversion is predominately done by biological growth (e.g., microorganisms). These reactors may be aerobic where aeration devices are typically used to provide mixing and dissolved oxygen to support the life cycle of the biological growth (e.g., microorganisms), or anaerobic, where mixing is to be provided without oxygen. The byproducts of aerobic biological conversion are typically $CO_2$, water and additional cell mass. The byproducts of anaerobic conversion are typically methane, carbon dioxide, water and additional cell mass. Other biological conversion processes are anoxic, where nitrates and/or nitrites supplant oxygen as the electron donor for metabolic activity and the byproducts are (for nitrified wastewaters) nitrogen gas, water and additional cell mass and nutrient conversion steps where intermediate reactions take place converting compounds to more environmentally friendly states.

The secondary clarifier 34 settles and returns the bacteria grown in the biological reactor 10 back to the biological reactor 10 to increase the concentration of bacteria and thereby allow more biological conversion to take place in the biological reactor 10 improving the efficiency and cost effectiveness of the wastewater treatment process.

Filters 36 are used to polish the effluent to further remove the small remaining suspended solids and related organics to provide a highly purified effluent. This effluent goes through a disinfector 40 where biological growth (e.g., microorganisms)/pathogens are inactivated to provide further protection to the health of the receiving body of water. In some systems, re-aeration 42 is employed to increase the dissolved oxygen level of the wastewater treatment plants effluent to further enhance the health of the receiving body of water Turning now to FIGS. 2 and 3, there is shown an elevation view of a biological reactor 10. This biological reactor 10 may be a tank, a basin, or a lagoon, it may be covered or uncovered, it may be aerated or not aerated; it may have natural or induced mixing or may be without natural or induced mixing or any combinations thereof. The biological reactor 10 is to provide an environment to promote the biological consumption or conversion of pollutants to less harmful states.

Contained in the biological reactor 10 is one or more controlled reaction-volume module(s) 12 (CRYM 12). These CRYM's 12 may be placed, positioned and supported in the reactor by a variety of attachments/supports 24 including, without limitation, any one of floats, side of reactor attachments/supports, bottom of reactor attachments/supports, or any combination of any of the preceding. In the case that the attachments/supports 24 includes a bottom of reactor attachment/support and the bottom of a biological reactor 10 is defined by a membrane that may be susceptible to puncture, applicants believe that it would be beneficial to include a load distributor 28 as shown with CRYM 12 on the right end of FIG. 3 to provide protection to the membrane and CRYM 12 of FIG. 5. A load distributor 28 may be as simple as a plate of a material that is capable of load distribution while at the same time withstanding the environment of a biological reactor 10.

Figure 3:
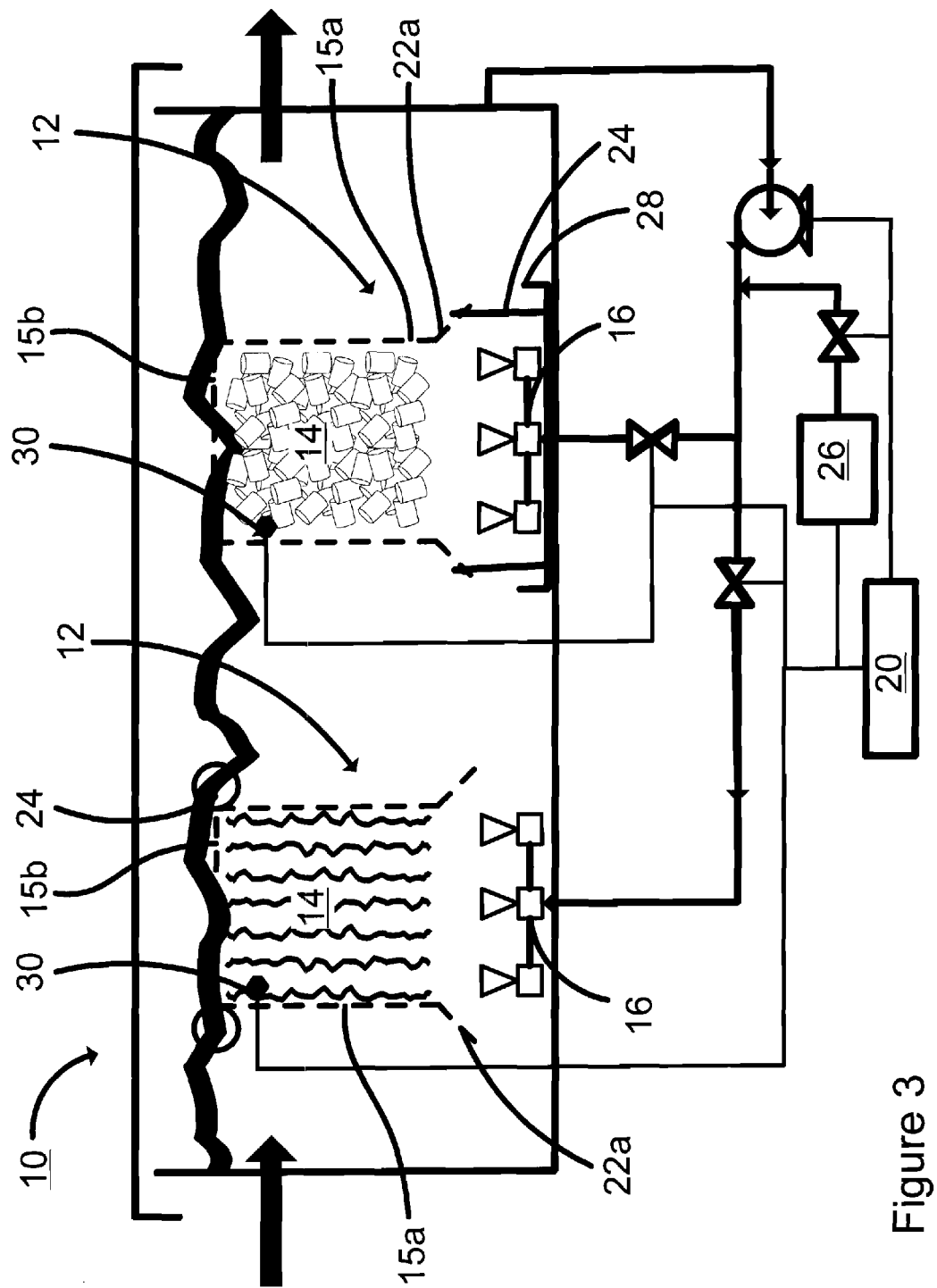
FIG. 3 is an elevation view schematic illustrating of a biological reactor including controlled-reaction-volume modules useable in the wastewater treatment system of FIGS. 1 and 2.
Figure 4:
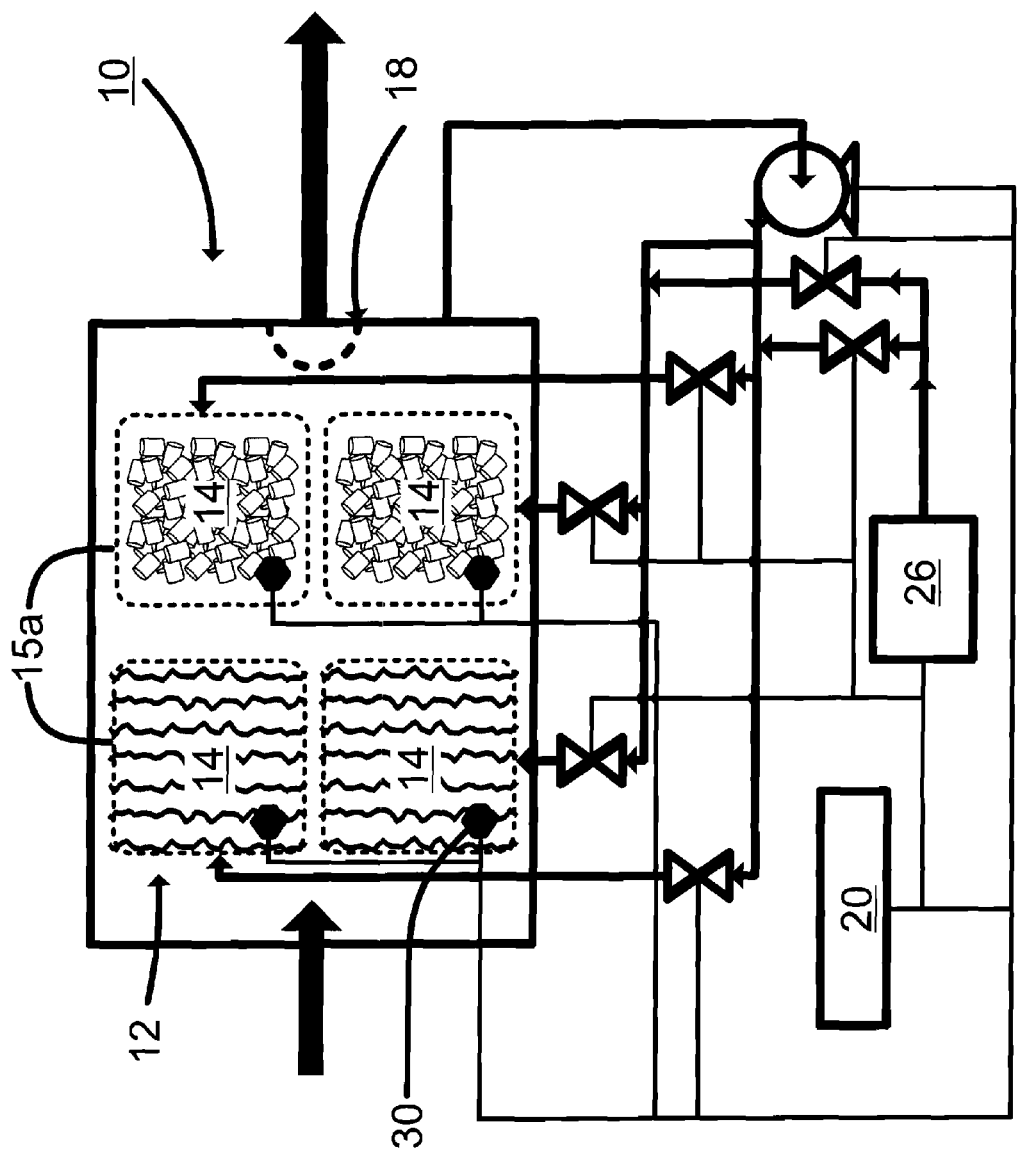
FIG. 4 is a plan view schematic of the biological reactor including controlled-reaction-volume modules of FIG. 3.
Figure 5:
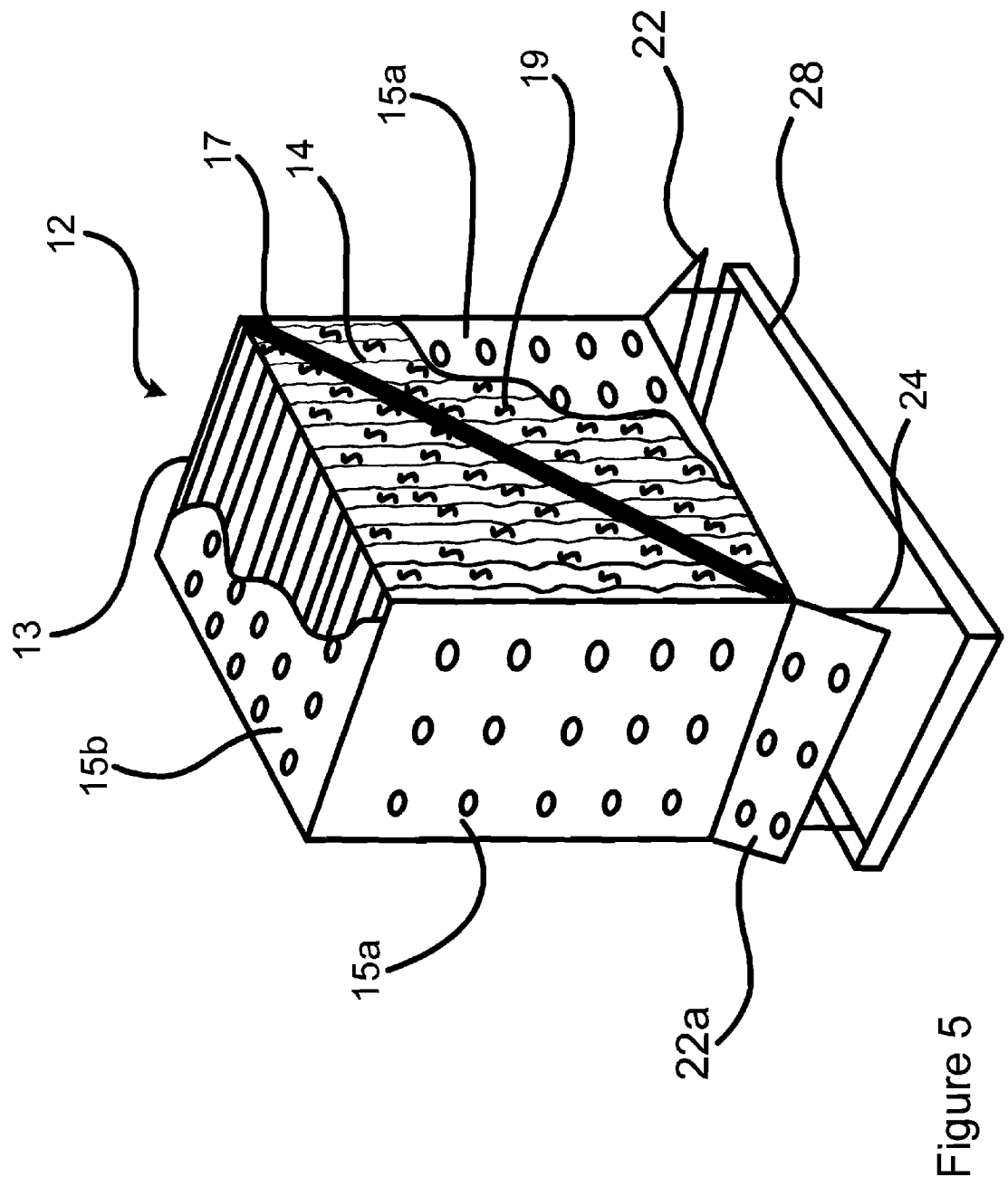
FIG. 5 is a partial cutaway, isometric schematic illustrating a controlled-reaction-volume module (CRVM) usable in a biological reactor of FIGS. 1, 2, 3, and 4.

FIG. 5 is a partial cutaway, isometric schematic illustrating a CRVM 12 usable in a biological reactor of FIGS. 1, 2, 3, and 4. A CRVM 12 channels a flow of the fluid in a controlled direction and normally in the vertical direction. This may be accomplished by either a partially horizontally enclosed partition 15b and/or partially vertically enclosed partition 15a or a substantially completely horizontally enclosed partition and/or vertically enclosed partition (both types of substantially completely enclosed partitions not shown in FIG. 5). A CRVM 12 further may include a flow director 22 such as, for example, either an expanded structure 22a or restricted structure proximate to the at least one mixer 16. For example, the flow director 22 may be an extension of at least a portion of a partition 15 of the CRVM 12 beyond the fixed film media 14.

A CRVM 12 further may include at least one support mechanism 24. Such a mechanism 24 may be used to locate a CRVM 12 within the biological reactor 10 or within a proximity of a CRVM 12 to impute flow through the CRVM 12. Examples of suitable support mechanism 24 include, without limitation, any one of a flotation mechanism, a floor stand, a suspension mechanism, or any combination of any of the preceding. A suspension mechanism may be, without limitation, any one of within the biological reactor 10, without the biological reactor 10, toward the top of the biological reactor 10, the bottom of the biological reactor 10, the side of the biological reactor 10, or any combination of any of the preceding.

The CRVM 12 includes media 14. The media 14 may be, without limitation, any one of rigid media, free moving media, a fabric, a media that facilitate a biological growth (e.g., bacteria), or any combination of any of the preceding. Media 14 is any that provides surface area sites for biological growth. (See e.g., U.S. Pat. No. 5,543,039 issued Aug. 6, 1996 and entitled "Reactor For Purification Of Water"; U.S. Pat. No. 5,771,716 issued Jun. 30, 1998 and entitled "Warp-Knitted Loop Net Fabric"; Hydroxyl-Pac media Hydroxyl Systems Inc. Sidney, BC Canada; U.S. Pat. No. 6,126,829 issued Oct. 3, 2000 and entitled "Biofilm Carrier For Water And Waste Water Purification"; U.S. Pat. No. 6,383,373 issued May 7, 2002 and entitled "Biological Filtration Apparatus"; U.S. Pat. No. 6,444,126 issued Sep. 3, 2002 and entitled "System And Method For Treating Sanitary Wastewater For On-Site Disposal"; U.S. Pat. No. D465,257 issued Nov. 5, 2002 and entitled "Biofilm Carrier Element"; U.S. Pat. No. 6,726,838 issued Apr. 27, 2004 and entitled "Biofilm Carrier, Method Of Manufacture Thereof And Waste Water Treatment System Employing Biofilm Carrier"; and WO03068694 published Aug. 21, 2004 and entitled "Method For Biological Purification Of Water Using A Carrier Material" {corresponding to EP1340720}).

The media 14 is contained in a CRVM 12 to allow for controlling the reaction conditions of the volume of the CRVM 12. A shape of a CRVM 12 may include, without limitation, any one of a straight open bottom 22c, a restricted open bottom 22b, an expanded open bottom 22a, or any combination of any of the preceding. The CRVM 12 may include, without limitation, any one of straight open top, a restricted open top, an expanded open top, or any combination of any of the preceding. A CRVM 12 may have a partition 15 including, without limitation, any one of rigid sides, flexible sides, continuous sides, vented, louvered, otherwise non-continuous sides, or any combination of any of the preceding. When CRVM 12 includes a free moving media, applicants believe that a size and shape of any openings in the partition 15 of the CRVM 12 should be such that a free moving media remains in the CRVM 12. It may further be beneficial to include a screen 18 at the exit of the biological reactor 10 as shown in FIG. 4 to capture any such media free moving media in case it escapes from the CRVM 12. Such partition 15 and/or screen 18 may be sized with openings smaller than the smaller dimension of a free moving media. For example, an opening of the partition 15 and/or screen 18 may be about ⅔ of the smaller dimension of a free moving media. A partition 15 and/or screen 18 may be constructed using a materials possessing corrosion resistance, such as, for example, stainless steel. Also, a partition 15 and/or screen 18 may be constructed of any one of a wedgewire, a round wire, a perforated and expanded metal, or any combination of any of the preceding.

A CRVM 12 may be constructed using a fabric media such as, for example, that manufactured by Apex Aridyne of Graham, N.C. (see e.g., U.S. Pat. No. 5,771,716 issued Jun. 30, 1998 and entitled "Warp-Knitted Loop Net Fabric"). Such fabric media is collapsed and when expanded may stretch to almost about 7½ feet across. The fabric media may be installed on stainless a steel frame 13 as part of a CRVM 12. For example, a frame 13 may measure about 8¾ feet bottom to top, about 7½ feet front side to back side, and about 14 feet left side to right side and be made of about 1¼ inch stainless steel bars spaced three inches apart, welded to a box frame. Flat plates may act as attachments/supports 24 and be bolted to the floor of a biological reactor 10. As shown in FIG. 5, diagonal plates 17 may be added to provide rigidity to a frame 13. Such a frame 13 may include about 3,000 pounds of stainless steel. Almost about ⅓ of a mile of fabric media may be stretched over the stainless steel bars to add about 1,000 pounds. A CRVM 12 without a partition 15 may weigh about 4,000 pounds.

Mixing devices 16 may be positioned at, without limitation, any one of below the media 14, above the media 14, or any combination of any of the preceding. Mixing devices 16 provide the function of controlling the mixing and/or aeration within a CRVM 12. The mixing devices 16 may be individual units, or multiple units and may be manifolded together systems that may incorporate control valving (see e.g., FIGS. 2, 3, and 4) to allow for controlled operation on an independent or group basis.

The mixing devices 16 may be, without limitation, any one of gas or air (pneumatic) mixers (See e.g., U.S. Pat. No. 4,595,296 issued Jun. 17, 1986 entitled Method And Apparatus For Gas Induced Mixing And Blending), liquid (hydraulic) mixers, or any combination of any of the preceding. The mixing device 16 may be powered by, without limitation, any one of a gas supply 26 (which could be a compressor or blower), a pump, or any combination of any of the preceding. A source of a gas may be, without limitation, any one of air (e.g., atmospheric), methane (e.g., from a biological activity), other commercially available gases (e.g., including nitrogen), or any combination of any of the preceding. A source of a liquid may be one of from within the biological reactor 10, a nitrified effluent, a return sludge, external source, or any combination of any of the preceding.

Optionally, one or more control sensors 30 may be incorporated into biological reactor 10, a CRVM 12, a number of CRVM's 12, or any combination of any of the preceding. To that end, the one or more control sensors 30 may be used for, without limitation, any one of overall biological reactor 10 control, a individual CRVM 12 control, a group CRVM 12 control, or any combination of any of the preceding. A sensor 30 may be any of a variety including, without limitation, any one of manual sensor (e.g., in the case of removal sections of media 14), a remote process sensor, or any combination of any of the preceding. A sensor 30 may be used to measure any of a variety of parameters including, without limitation, any one of pH, time, temperature, ammonia, nitrites, nitrates, total N, total P, ORP, dissolved oxygen, oxygen uptake rates, developed sensor parameters, or any combination of any of the preceding. Information from sensors 30 may be processed automatically or manually in a controller 20. The controller 20 processes sensor inputs and controls CRVM 12 function by outputs to controls valves (see e.g., FIGS. 2, 3, and 4), outputs to the pneumatic power supply with control interface and with outputs to hydraulic power with control interface.

In operation, wastewater coming into the biological reactor 10 exhibits various characteristics and has various process demands on the treatment system to allow the system to perform as designed. A factor in optimizing the effectiveness of a biological treatment system 10 is to concentrate as many beneficial biological growth (e.g., microorganisms) as possible in the space available and to keep them performing at optimum rates. The CRVM 12 provides a controlled environment for a fixed growth high-density biological growth population. For optimum effectiveness, this population exits a controlled environment. Control parameters include such major items as food supply, oxygen and mixing. Controlling these parameters impact other biological variables including a type of biological growth a CRVM 12 optimizes.

By purposely controlling the mixing within each CRVM 12, biological growth thickness can be controlled as well as control of the transport of substrate (food) and oxygen or nitrate (for aerobic or anoxic systems respectively) within a CRVM 12. Individual CRVM's 12 may be independently and/or periodically highly mixed/aerated to remove older and/or excess biological growth and provide a thinner new biological growth to optimize CRVM 12 and biological reactor 10 performance.

Worm predation is also variable to be considered in controlling and optimizing a performance of a biological reactor 10 where fixed film medias are employed. Reducing the dissolved oxygen level in the media 14 to levels below that supporting worm populations and doing so for a controlled time frame is one manner for effecting worm control. Individual and/or controlled grouping of CVRM's 12 may operate in this reduced dissolved oxygen mode while the overall biological reactor 10 continues in full functional dissolved oxygen level biological mode. This may be contrasted to having to take an entire basin to very low to no DO for extended time frames that could have negative impact on overall wastewater treatment system 8 effectiveness. The controllability allows for continual automatic online work control as part of the basic wastewater treatment system 8 operating rational.

FIG. 3 is a plan view showing a biological reactor 10 having four (4) CRVM's 12 manifolded together with the provision for valve isolation. Each CRVM 12 contains mixing devices 16 and provision for control sensors 30. Mixing and/or aeration are provided from pneumatic sources 26 or pumping sources or combination thereof.

Provision may be made to provide commercially available specialized bacteria (and food—wastewater or synthetic) into a CRVM 12 (See e.g., U.S. Pat. No. 5,863,128 issued Jan. 26, 1999 and entitled Mixer-Injectors With Twisting And Straightening Vanes). This may be referred to as bioaugmentation. Some example of products for municipal wastewater treatment and related areas available from Novozymes Biologicals Inc. Salem, Va., USA that may be used include:

| BI-CHEM ® 2000 series | Target |
| --- | --- |
| BI-CHEM ® 2000GL | Fats, oils, and grease |
| BI-CHEM ® 2003MS | Cold weather BOD |
| BI-CHEM ® 2006RG | Surfactant assisted for severe grease |
| BI-CHEM ® 2008AN | Anaerobic digester grease |
| BI-CHEM ® 2009GT | Anaerobic lift stations |
| BI-CHEM ® 2010XL | Treatment plant optimization |
| BI-CHEM ® 1010 | Nitrification |
| BI-CHEM ® Odor Controller | Non-sulfide odors |
| BI-CHEM ® Nitraid ™ | Sulfide control |

Some example of products for industrial wastewater treatment and related areas available from Novozymes Biologicals Inc. Salem, Va., USA that may be used include:

| BI-CHEM ® 1000 series | Target |
|---|---|
| BI-CHEM ® 1000DL | Industrial drain lines |
| BI-CHEM ® 1002CG | Phenolics and related compounds |
| BI-CHEM ® 1003 FG | Food processing |
| BI-CHEM ® 1004TX | Surfactants |
| BI-CHEM ® 1005PP | Pulp and paper |
| BI-CHEM ® 1006KT | Acetone and related ketones |
| BI-CHEM ® 1008CB | General chemical |
| BI-CHEM ® 1738CW | Cold weather BOD |
| BI-CHEM ® ABR Hydrocarbon | Petroleum hydrocarbons |
| BI-CHEM ® 1010N | Nitrification |
| BI-CHEM ® Odor Controller | Non-sulfide odors |
| BI-CHEM ® Nitraid ™ | Alternate electron acceptor |
| BI-CHEM ® MicroTrace | Biological tracer |

This bioaugmentation may be used, for example, in lagoons where it's difficult to concentrate biological growth (e.g., microorganisms) or for enhancing nitrification or removal of other target compounds.

In operation, wastewater enters the biological reactor 10 for treatment and flow onto the next unit operation. Suspended biological growth (e.g., microorganisms) are concentrated by returning underflow from the secondary clarifier 34 and consume pollutants. In order to enhance the removal characteristics of the biological reactor 10, fixed film media is added to the biological reactor 10 to increase the biological effectiveness and provide enhanced biological growth and control of biological growth. Without limitation, typical applications may include: Anoxic, Aerobic, Heterotrophic growth, and Nitrifying organisms.

Anoxic: CRVM's 12 have flow induced without the introduction of dissolved oxygen. An enhanced function is for returned nitrified effluent to be returned directly into the CRVM 12 to both facilitate mixing and biological conversion.

Aerobic: Aeration is conducted in the basin by conventional means including diffused aeration and surface mechanical aeration. CRVM's 12 media 14 grows high densities of desirable biological growth (e.g., microorganisms). Flow is induced thru the CRVM 12 by the mixing device 16. Due to the high rate of microbial activity, high growth rates may occur resulting in thick film growth on the fixed film media. By controlling the mixing intensities within the CRVM 12 through control of the mixing device 16, the film thickness and resultant biological effectiveness may be controlled and optimized.

CRVM's 12 may have high rate mixing cycles independently or in groups programmed into the controller 20 based upon sensor to purge excess growth to maintain overall operational maximum efficiencies.

CRVM 12 may also individually or in groups be subjected to low to no dissolved oxygen environments by stopping Mixing devices 16. This condition promotes the worm cure environment on a module specific basis. The worms 19 will release and exit the module. Excessive worm growth may be especially detrimental to modules specifically dedicated to nitrification.

CRVM 12 may also individually or in groups be subjected to low to no dissolved oxygen environments by stopping mixing devices 16. This condition may be utilized to force bacteria to use the ammonia converted during aerobic operation into nitrites/nitrates as the electron donor, thereby further reducing nitrogen compounds for more complete treatment.

Heterotrophic growth: Heterotrophic growth is fast growing and typically focused on consumption of organics quantified as BOD (Biochemical Oxygen Demand). Worms 19 in the fixed film media in heterotrophic applications typically are not a problem and can actually be beneficial due to their reduction in net waste sludge.

Nitrifying organisms: Nitrifying organisms are autotrophic and necessary for many current advanced wastewater treatment applications. Nitrifiers are relatively slow growing and the predation on them by worms 19 can adversely affect population densities needed for effective treatment.

The ability of the CRVM 12 to control the reactor environment (dissolved oxygen content in this case) provides for controlling the worm population independent of entire basin environment and thereby optimizing efficiencies of basin utilization and bacterial diversity.

For example, in a logic sequence for CRVM 12 operation, one CRVM 12 is in "worm cure mode". This CRVM 12 may have no mixing. Dissolve oxygen level is "non-detect". The timer puts this mode into effect for about 18 hours. The timer also reinitiates this mode again in 12 days to capture the inactivation of the reproductive life cycle of the undesired organism.

The controller 20 initiates these cycles to individual CRVM's 12 or groups of CRVM's 12 to minimize the number of modules that are off aerobic line at any one time.

Based upon sensor 30 inputs, mixing is periodically significantly increased to promote removal of excessive biological growth and maintain optimum reactor effectiveness. Controller 20 maintains continuity, hierarchy of operations and control by operations.

Figure 6:
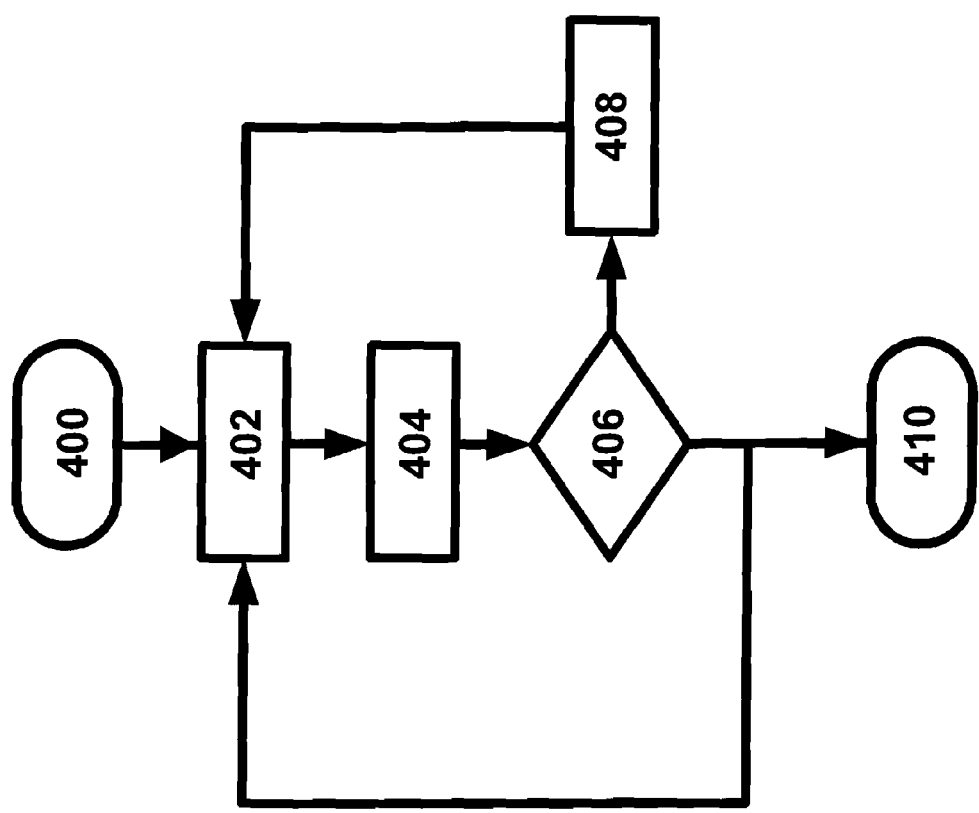
FIG. 6 is a control flow diagram useable with a biological reactor including controlled-reaction-volume modules of FIGS. 1, 2, 3, and 4.

FIG. 6 represents the logic pathway of the controller 20 and sensors 30. The logic pathway is initiated at 400. A signal passes from 410 to 402 and then to 404. Boxes 402 and 404 represent sensors that can detect settings such as biological growth activity, pH, dissolved oxygen, enzymes, ATP, ADP, ammonia, nitrates, ORP or predator presence in order to vary the activity of the mixer through the controller. Box 406 is a decision point. If a sensor 30 is triggered the signal moves to 408, otherwise it stays in a loop to 402. Box 408 changes the speed of the mixer from off to maximum depending on the value detected by the sensors represented by 402 and 404. The signal then loops back through to 402 to detect if a sensor has been triggered again.

Certain modifications and improvements will occur to those skilled in the art upon a reading of the foregoing description. By way of example, medias may be developed forming modules and/or oriented so that they channel desired flows thru the media 14 without the use of independent enclosures. Also, medias 14 and/or CRVM's 12 may be developed that don't require separate supports mechanisms and/or that the structure is also media. Additionally, instead of using a CRVM 12 in a suspended biological growth environment, the CRVM 12 may be used in an absence of suspended biological growth provided by the return activated sludge (RAS) from a secondary clarifier 34. This mode may be advantageous in various circumstances, such as when a secondary clarifier 34 is not available or desired. This situation could be the result of a desire to not have to manage the clarifier or RAS. Also additionally, it may be desirable to combine different methods of mixing, such as a bubbler and a mechanical mixer. This could be advantageous in being able to mix in alternating aerobic/anaerobic environments such as in a sequencing batch reactor or SBR. It should be understood that all such modifications and improvements have been deleted herein for the sake of conciseness and readability but are properly within the scope of the following claims.

We claim:

1. A wastewater treatment system comprising a biological reactor comprising:
   a) at least one module comprising:
      i) at least one fixed fixed-film media for supporting a biological growth within the at least one module,
      ii) a frame capable of supporting the at least one fixed fixed-film media, and
      iii) a partially enclosing foraminous vertical partition surrounding the frame; and
   b) at least one mixer capable of communicating a fluid to the at least one fixed fixed-film media of the at least one module so as to be capable of removing excess biological growth from the at least one fixed fixed-film media.

2. The wastewater treatment system according to claim 1 further including at least one controller.

3. The wastewater treatment system according to claim 2 wherein the at least one controller is capable of alternating an environment within the at least one module among any one of aerobic and anoxic; anoxic and anaerobic; aerobic and anaerobic; and aerobic, anoxic, and anaerobic.

4. The wastewater treatment system according to claim 2 wherein the at least one controller communicates with the at least one mixer.

5. The wastewater treatment system according to claim 2 wherein the at least one controller is mechanical.

6. The wastewater treatment system according to claim 5 wherein the at least one controller is operated manually.

7. The wastewater treatment system according to claim 2 wherein the at least one controller is capable of facilitating control of at least one biological-growth predator.

8. The wastewater treatment system according to claim 2 wherein the at least one controller is capable of controlling a dissolved oxygen concentration within the at least one module.

9. The wastewater treatment system according to claim 2 wherein the biological reactor further comprises an additional module and the at least one controller is capable of controlling a dissolved oxygen concentration within each module independently.

10. The wastewater treatment system according to claim 2 further including at least one sensor.

11. The wastewater treatment system according to claim 10 wherein the at least one sensor is capable of measuring biological activity.

12. The wastewater treatment system according to claim 1 wherein the at least one module further comprises a foraminous horizontal partition.

13. The wastewater treatment system according to claim 1 wherein the at least one module contains any one of a substantially completely vertically enclosing partition, a substantially completely horizontally enclosing partition, or any combination of any of the preceding.

14. The wastewater treatment system according to claim 10 wherein the at least one sensor is capable of measuring any one of:
   a) pH;
   b) dissolved oxygen (DO);
   c) at least one enzyme level;
   d) ammonia;
   e) nitrates;
   f) nitrites; or
   f) any combination of any of the preceding.

15. The wastewater treatment system according to claim 14 wherein the at least one sensor is capable of measuring any one of an adenosine triphosphate (ATP) level, an adenosine diphosphate (ADP) level, an oxidation-reduction potential (ORP) level, or any combination of any of the preceding.

16. The wastewater treatment system according to claim 10 wherein the at least one sensor is capable of indicating a presence of a biological-growth predator.

17. The wastewater treatment system according to claim 16 wherein the at least one sensor is a coupon.

18. The wastewater treatment system according to claim 16 wherein the biological-growth predator is a worm.

19. The wastewater treatment system according to claim 2 further including at least one clarifier upstream from the biological reactor.

20. The wastewater treatment system according to claim 1 further including at least one clarifier downstream from the biological reactor.

21. The wastewater treatment system according to claim 1 further including at least one headworks upstream from the biological reactor.

22. The wastewater treatment system according to claim 1 at least one disinfector downstream from the biological reactor.

23. The wastewater treatment system according to claim 1 further including at least one re-aerator downstream from the biological reactor.

24. The wastewater treatment system according to claim 1 wherein the biological reactor further comprise at least one additional module, the at least one additional module comprising:
   i) at least one fixed fixed-film media for supporting a biological growth fixed within the at least one module,
   ii) a frame capable of supporting the at least one fixed fixed-film media, and
   iii) a foraminous vertical partition surrounding the frame; and
   wherein that at least one mixer is also capable of communicating a fluid to the at least one fixed fixed-film media of the at least one additional module so as to be capable of removing excess biological growth from the at least one fixed fixed-film media.

25. The wastewater treatment system according to claim 24 wherein each of the modules is capable of being alternated among any one of aerobic and anoxic; anoxic and anaerobic; aerobic and anaerobic; and aerobic, anoxic, and anaerobic.

26. The wastewater treatment system according to claim 25 wherein the alternating among any one of aerobic and anoxic; anoxic and anaerobic; aerobic and anaerobic; and aerobic, anoxic, and anaerobic is capable of being independent for each of the modules.

27. The module according to claim 24 wherein the at least one mixer is spatially and vertically aligned with each module so as to be capable of upwardly communicating the fluid through and in fluid communication with the fixed fixed-film media of each module.

28. A wastewater treatment system comprising a biological reactor comprising:
   a) a plurality of modules, each module comprising:
      i) at least one fixed fixed-film media for supporting a biological growth within the at least one module,
      ii) a frame capable of supporting the at least one fixed fixed-film media, and
      iii) a partially enclosing foraminous vertical partition surrounding the frame; and
   b) at least one mixer capable of communicating a fluid to the at least one fixed fixed-film media of each module so as to be capable of removing excess biological growth from the at least one fixed fixed-film media.

29. A wastewater treatment system comprising a biological reactor comprising a plurality of modules, each module comprising:
  a) at least one fixed fixed-film media for supporting a biological growth within the at least one module;
  b) a frame capable of supporting the at least one fixed fixed-film media;
  c) a partially enclosing foraminous vertical partition surrounding the frame; and
  d) at least one mixer capable of communicating a fluid to the at least one fixed fixed-film media so as to be capable of removing excess biological growth from the at least one fixed fixed-film media.

30. The module according to claim 29 wherein the at least one mixer of each module is spatially separated from and vertically aligned with the module so as to be capable of upwardly communicating the fluid through and in fluid communication with the fixed fixed-film media of the module.

31. A wastewater treatment system comprising a biological reactor comprising at least one module comprising:
  a) at least one fabric fixed-film media for supporting a biological growth within the at least one module;
  b) a frame capable of supporting the at least one fabric fixed-film media;
  c) a foraminous vertical partition surrounding the frame; and
  d) at least one mixer below the at least one module so as to be capable of periodically upwardly communicating a fluid through and in fluid communication with the at least one fabric fixed-film media of the at least one module so as to be capable of removing excess biological growth from the at least one fixed fixed-film media.

32. A wastewater treatment system comprising a biological reactor comprising at least one module comprising:
  a) at least one webbed fabric fixed-film media for supporting a biological growth within the at least one module;
  b) a frame capable of supporting the at least one webbed fabric fixed-film media;
  c) a foraminous vertical partition surrounding the frame; and
  d) at least one mixer below the at least one module so as to be capable of periodically upwardly communicating a fluid through and in fluid communication with the at least one webbed fabric fixed-film media of the at least one module so as to be capable of removing excess biological growth from the at least one fixed fixed-film media.

* * * * *